United States Patent [19]

Usui

[11] Patent Number: 4,513,344
[45] Date of Patent: Apr. 23, 1985

[54] PROTECTIVE RELAY FOR POWER SYSTEM

[75] Inventor: Masaji Usui, Hyogo, Japan

[73] Assignee: Mitsubishi Denki Kabushiki Kaisha, Tokyo, Japan

[21] Appl. No.: 454,066

[22] Filed: Dec. 28, 1982

[30] Foreign Application Priority Data

| Dec. 29, 1981 [JP] | Japan | 56-212415 |
|---|---|---|
| Mar. 5, 1982 [JP] | Japan | 57-35383 |
| Mar. 5, 1982 [JP] | Japan | 57-35391 |
| Mar. 5, 1982 [JP] | Japan | 57-35392 |
| Mar. 5, 1982 [JP] | Japan | 57-35393 |

[51] Int. Cl.³ .............................................. H02H 1/00
[52] U.S. Cl. ...................... 361/113; 361/78; 361/86; 361/87
[58] Field of Search .................... 361/87, 113, 86, 78; 328/146, 147, 149, 117; 307/355, 356

[56] References Cited

U.S. PATENT DOCUMENTS 3,984,734 10/1976 Becker ........................ 361/87 X

FOREIGN PATENT DOCUMENTS 101019 7/1980 Japan .

Primary Examiner—Reinhard J. Eisenzopf
Attorney, Agent, or Firm—Bernard, Rothwell & Brown

[57] ABSTRACT

A protective relay which generates a signal to protect an object in a power system that is to be protected in response to a differential signal and a suppress signal showing an abnormal condition, which are obtained from electric currents of two separate points in the object. The protective relay is equipped with a logical decision circuit which generates the signal to protect the object only when the differential signal is greater than a predetermined value, and the second harmonic component contained in the differential signal is smaller than a predetermined ratio.

4 Claims, 8 Drawing Figures

PROTECTIVE RELAY FOR POWER SYSTEM

FIELD OF THE INVENTION

The present invention relates to an apparatus for detecting a fault that may develop in a power system, and more specifically to a circuit for detecting a fault that may develop in the power system from fundamental waves and higher harmonic components contained in current signals that are detected from the object of the power system to be protected to provide signals for protective operation.

BACKGROUND OF THE INVENTION

A conventional typical protective relay of this type has a circuit which is illustrated in FIG. 1, which introduces a suppress signal 1 obtained from the sum of electric currents detected from two separate points of object to be protected, such as a power transformer connected in a power system, and a differential signal 2 obtained from the difference thereof to a difference ratio detector 3. When a decision is made that the differential signal 2 is greater than the suppress signal 1 by more than a predetermined ratio, the detector 3 produces an output signal b of high level. The differential signal 2 is also supplied to a level detector 4 which produces an output when the level of the differential signal becomes greater than a predetermined value, and to harmonic ratio detectors 5 and 6 which produce signals when the second harmonic component contained in the differential signal becomes greater than the fundamental wave component contained in the differential signal by more than a predetermined ratio. Output signal b of the detector 3 is supplied to a first input terminal of an AND gate 9, output signal a of the detector 5 is supplied to a second inverted logic input of the gate 9, which performs an AND operation with these signals, and the resulting signal is supplied to an OR gate 10 to perform an OR operation with the output signal c of the detector 4. The gate 10 is connected for providing an actuate signal d to a protective device or circuit breaker which is not shown.

Output signal e of the detector 6 is supplied to a delay circuit 7 which produces output signal of high level when the output signal e maintains the high level for more than a time duration Td. Output of the delay circuit 7 is supplied to a delay circuit 8 which continuously produces output signal of high level for a time duration Th when the output of the delay circuit 7 drops from high level to low level, and output of the delay circuit 8 is supplied to an input of an AND gate 11. Another input of the AND gate 11 is an inverted logic input which is served with the signal c of the detector 4. The AND gate 11 performs AND operation with these two inputs to produce a lock signal f to inhibit the operation of the circuit breaker which is not shown.

FIG. 2 illustrates operational waveforms of each of the portions of the circuit shown in FIG. 1. Let it be assumed that an abnormal condition occurs in the object to be protected at a time $t_O$, and for a certain reason, after a time $t_f$, the level of the differential signal 2 drops from a given level to the low level at the time $t_f$ as shown in FIG. 2. Differential quantity $I_D$ contained in the differential signals 2 starts to increase from the time $t_O$ in a vibrating manner, but decreases from the time $t_f$. A the second harmonic component $If_2$ is generated temporarily after the times $t_O$ and $t_f$ with substantial level caused by the transient response of a filter in the detector 5. During the period from time $t_O$ to time $t_f$, therefore, the detector 4 produces the signal c of high level to inhibit the operation of gate 11, and the detector 5 produces the signal a to inhibit the operation of gate 9 so that the signal f is not produced. After the time $t_f$ has passed, however, the differential quantity $I_D$ decreases, and the detector 4 changes the signal c from high to low level. Therefore, the gate 11 is released from the inhibited condition, and the signal f is produced for blocking proper operation of the device. Such an erroneous operation may be prevented by increasing the delay time of the delay circuit 7. Increase in the delay time, however, presents such an inconvenience that the response time of the device is significantly delayed for proper fault protective operation.

OBJECTS OF THE INVENTION

The object of the present invention is to provide a protective relay which is capable of properly performing the function even when the level of differential signal is decreased.

Another object of the present invention is to provide a protective relay which is capable of properly performing the function without being affected by the difference in the response characteristics between the two detectors for detecting second harmonic components.

SUMMARY OF THE INVENTION

According to the present invention, the protective relay comprises a first detector which introduces differential and suppress signals detected from the currents of an object that is to be protected, and which produces an output when the differential signal becomes greater than the suppress signal by more than a predetermined ratio, a second detector which produces an output when the differential signal becomes greater than a predetermined value, and third and fourth detectors which produce outputs respectively when the second harmonic component contained in the differential signal becomes greater than the fundamental wave component contained also in the signal by more than a predetermined ratio, wherein it is examined whether outputs of these detectors satisfy predetermined logic conditions for discriminating a fault in the object to be protected, and an actuate signal is supplied to a circuit breaker to protect the object when the logic conditions are satisfied.

BRIEF DESCRIPTION OF THE DRAWINGS

Advantages of the invention will become obvious from the following description in conjunction with the accompanying drawings, in which the same reference numerals denote the portions having the same functions.

DESCRIPTION OF THE PREFERRED EMBODIMENTS

Figure 1:
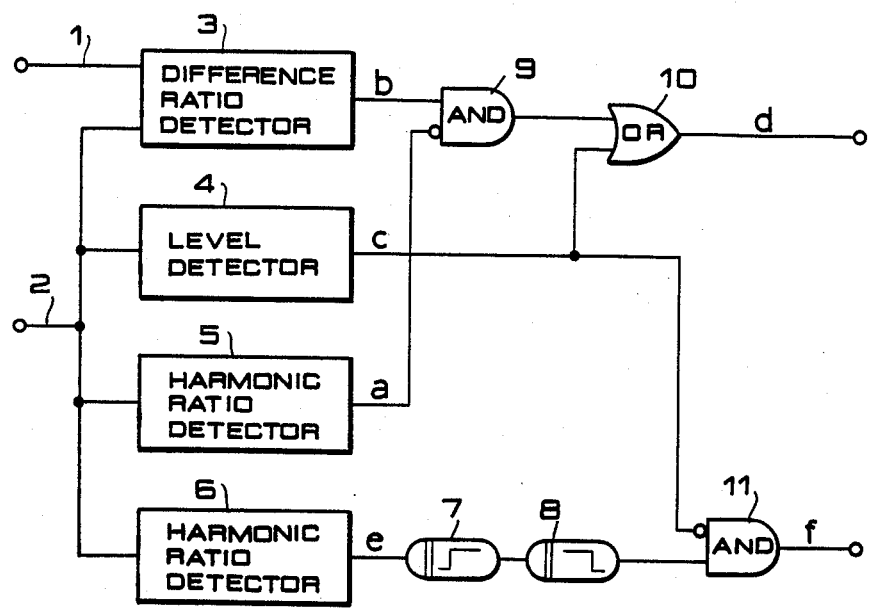
FIG. 1 is a circuit diagram of a conventional typical protective relay.
Figure 3:
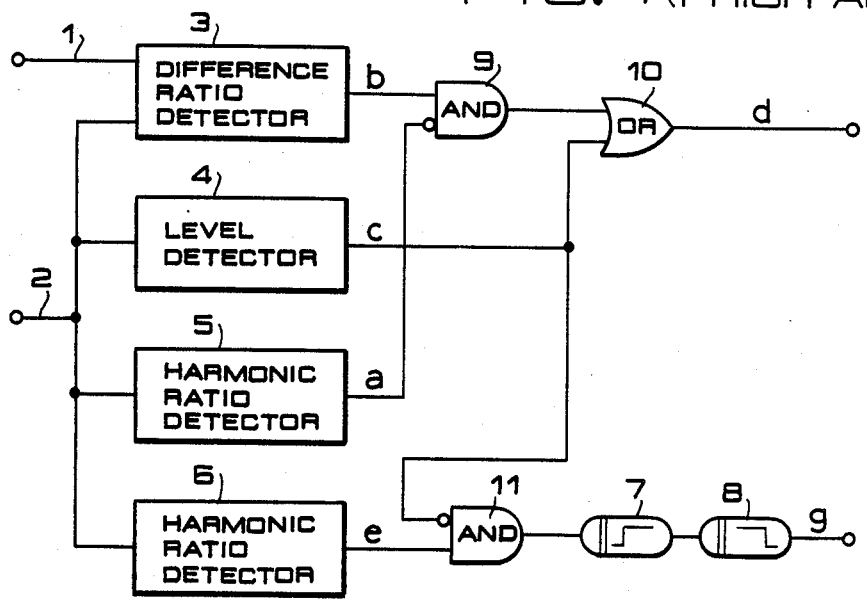
FIG. 3 is a circuit diagram of a protective relay according to an embodiment of the present invention.

FIG. 3 illustrates the circuit of a protective relay according to the present invention. Signals 1 and 2 mentioned already are supplied to the detectors 3, 4, 5 and 6 which were also mentioned and which produce signals b, c, a and e. The signal b is supplied to the first input of the AND gate 9, and the signal a is supplied to the second input which is an inverted logic input of the AND gate 9 which performs AND operation with these signals, and which produces an output for applying to the first input of the OR gate 10. The OR gate 10 performs OR operation with the output of the gate 9 and the signal c of the detector 4, and produces a resulting signal d for actuating the circuit breaker which is not shown. The signal c is supplied to the first input of the AND gate 11 of which the second input is served with the signal e of the detector 6. The AND gate 11 performs AND operation with the signal c and the signal e. The resulting signal is applied to the delay circuit 7 which has delay time Td in operation, and then to the delay circuit 8 which has delay time Th in restoration. Finally, an inhibit or lock signal g is produced by the delay circuit to inhibit the operation of the circuit breaker which is not shown.

Figure 2:
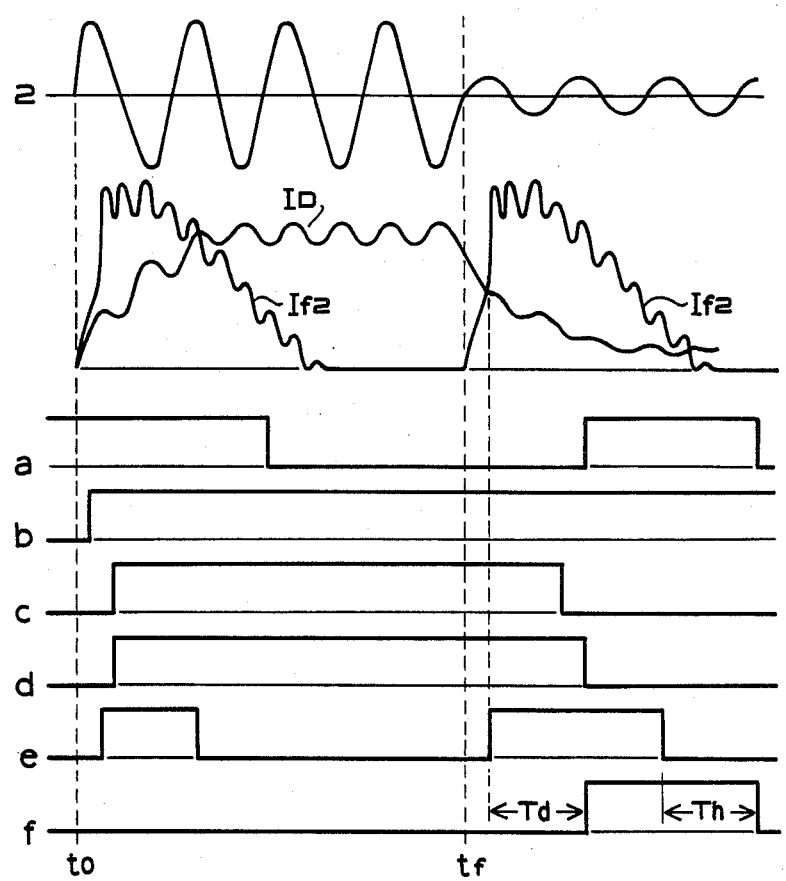
FIG. 2 is a diagram of waveforms of each of the portions for explaining the operation of the circuit shown in FIG. 1.
Figure 4:
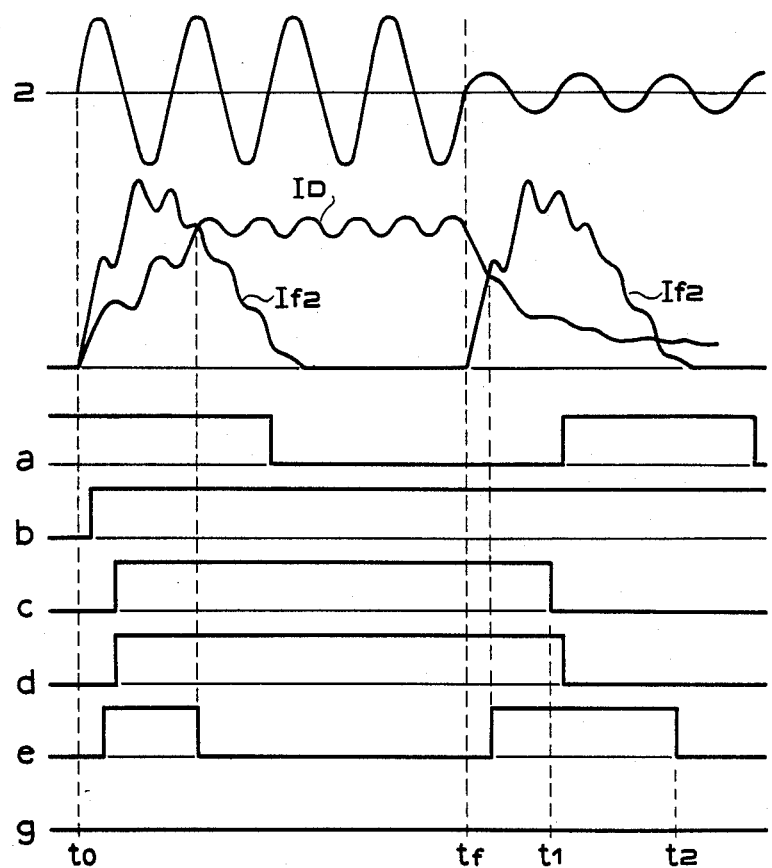
FIG. 4 is a diagram of waveforms of each of the portions for explaining the operation of the circuit shown in FIG. 3.

In operation if the signals 1 and 2 are as shown in FIG. 4 like those of FIG. 2, the detectors 3 to 6 produce the signals b, c, a and e of high level respectively after the time $t_O$ has passed. Therefore, the gates 9 and 11 are blocked by the signals a and c so that the signal g is not generated. However, the signal c of the detector 4 causes the gate 10 to produce the actuate signal d.

As the differential quantity $I_D$ starts to decrease and the second harmonic component $If_2$ starts to increase from the time $t_f$ as shown in FIG. 4, the detector 6 produces the signal e of high level. However, since the detector 4 is producing the signal c of high level to block the AND gate 11, the signal g is not produced. At a time $t_1$ at which the differential quantity $I_D$ is decreased to a low level, the detector 4 drops the signal c to low level and the detector 5 produces the signal a of high level. Therefore, the signal d is not produced from the gate 10 and the gate 11 opens since the signal c assumes a low level. At a time $t_2$, however, the signal e assumes a low level. The time duration $t_2 - t_1$ is shorter than the delay time Td of the delay circuit 7. Therefore, the delay circuit 7 is not allowed to produce output of high level. That is, the signal g is not yet supplied. In order to produce the signal g, there is required the condition that the gate 11 must be kept open for more than the delay time Td of the delay circuit 7.

Figure 5:
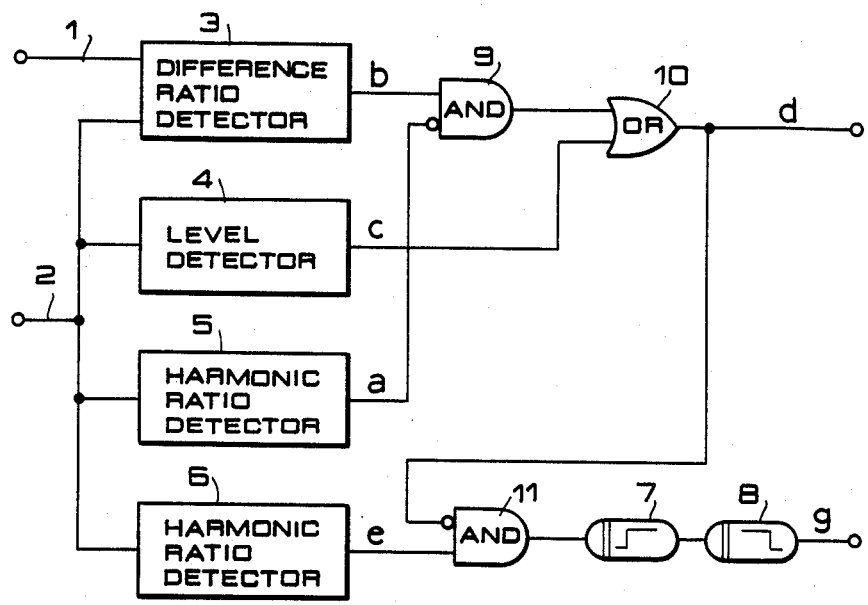
FIG. 5 is a circuit diagram of a protective relay according to a second embodiment of the present invention.

FIG. 5 illustrates a circuit according to a second embodiment of the present invention, in which the first input of the gate 11 is connected to the output of the gate 10. The condition for supplying the signal g, therefore, includes the condition of the gate 9 to be blocked. With regard to other respects, the circuit of FIG. 5 is arranged in the same manner as the circuit of FIG. 4.

Figure 6:
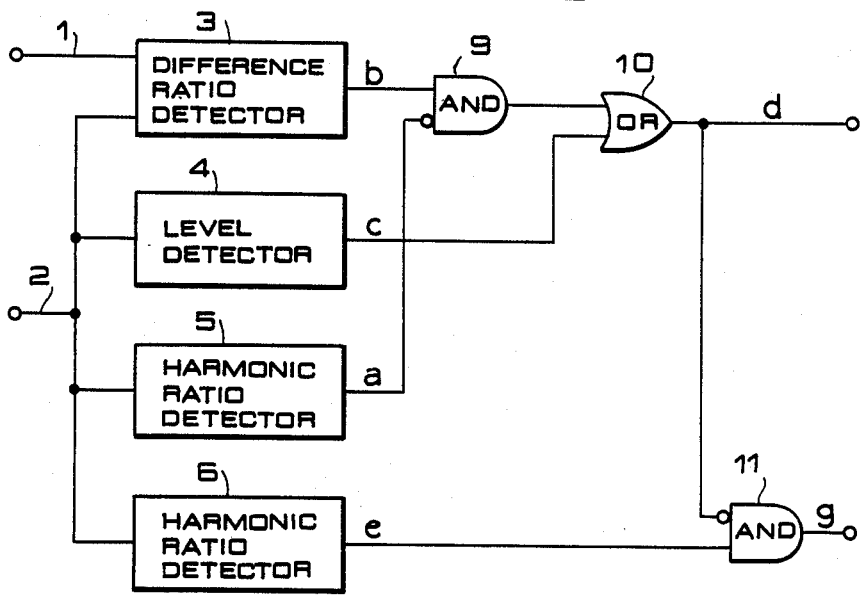
FIG. 6 is a circuit diagram of a protective relay according to a third embodiment of the present invention.

FIG. 6 illustrates a circuit according to a third embodiment of the present invention, which is the same as the circuit of the second embodiment of FIG. 5, except that the delay circuits 7 and 8 are eliminated from the circuit of FIG. 5 so that the output from the gate 11 is not confirmed by the delay circuits in regard to time duration, but is directly used as an inhibit signal g.

Figure 7:
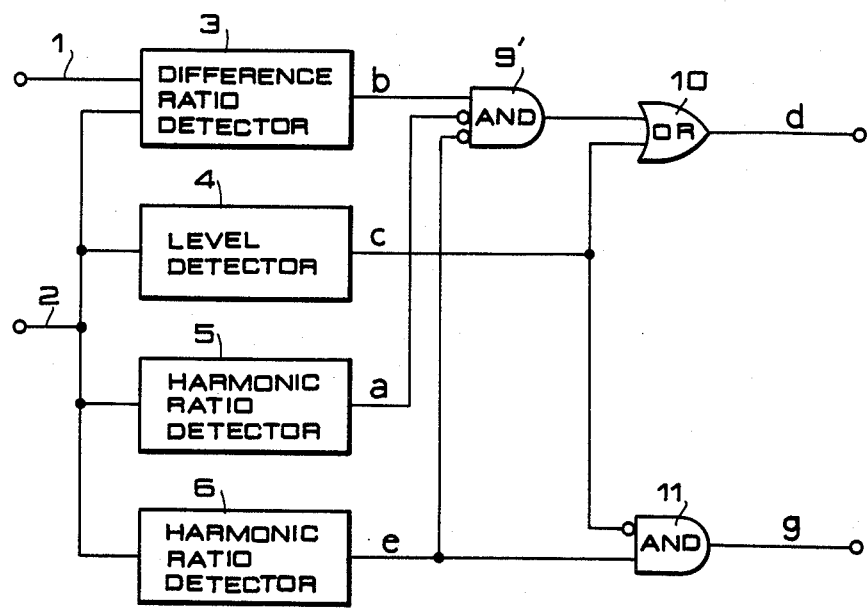
FIG. 7 is a circuit diagram of a protective relay according to a fourth embodiment of the present invention.

FIG. 7 illustrates a circuit according to a fourth embodiment of the present invention, in which the signal b of the detector 3 is supplied to the first input of the AND gate 9', and signals a and e of the detectors 5, 6 are, respectively, supplied to second and third inverted logic input so that AND operation is performed with these signals. Output of the gate 9' is supplied to the gate 10 which produces the signal d. The circuit is the same as the circuit of the third embodiment with regard to other respects.

Figure 8:
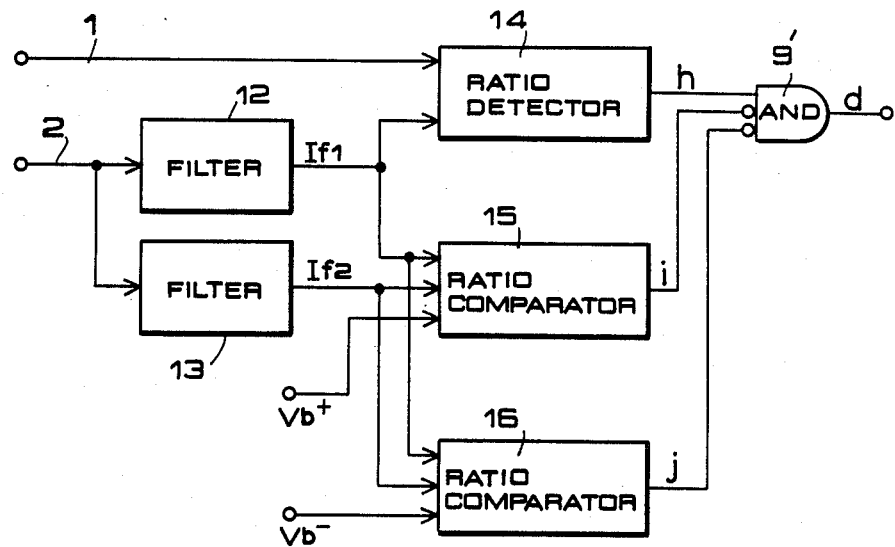
FIG. 8 is a circuit diagram of a protective relay according to a fifth embodiment of the present invention.

FIG. 8 illustrates a circuit according to a fifth embodiment of the present invention. The differential signal 2 is supplied to a filter circuit 12 which may include a low pass filter for extracting a fundamental wave component $If_1$ therefrom, and to a filter 13 which may include a band pass filter for extracting a second harmonic component $If_2$ therefrom. Signal $If_1$ of the circuit 12 is supplied to the ratio detector 14, and to the comparators 15 and 16. The ratio detector 14 produces a signal h when the ratio of the signal $If_1$ to the differential signal 2 becomes greater than a predetermined value. The comparator 15 is served with the signals $If_1$, $If_2$ and bias $Vb^+$ which has a positive value, and produces a signal i when a relation $$\frac{If_2 + Vb^+}{If_1} > k \ (k \text{ is a constant})$$

is satisfied. The comparator 16 is served with the signals $If_1$, $If_2$ and bias $Vb^-$ which has a negative value, and produces a signal j when a relation $$\frac{If_2 + Vb^-}{If_1} > k$$

is satisfied.

Further, provision is made of an AND gate 9' which receives the signal h at the first input and signals i and j at the second and third inverted logic input terminals. The AND gate 9' produces a signal d based upon the result of AND operation with the signals h, i and j. The signal d thus produced by the above-mentioned logics is used to actuate the circuit breaker which is not shown.

Although the above-mentioned description has dealt with particular embodiments only, it should be noted that the invention can be modified in a variety of other ways by those skilled in the art without departing from the spirit and scope of the invention, which are recited in the following claims.

What is claimed is:

1. A protective relay which generates signals to protect an object in a power system that is to be protected in response to a differential signal and a suppress signal obtained from electric currents that are detected from two separate points of the object, said protective relay comprising:

first detection means which produces a signal of first condition when said differential signal is greater than said suppress signal by more than a predetermined ratio;

second detection means which produces a signal of second condition when the level of said differential signal becomes greater than a predetermined value;

third and fourth detection means which produce a signal of third condition and a signal of fourth condition, respectively, when the second harmonic component contained in said differential signal is greater than the fundamental wave component contained in the differential signal by more than a predetermined ratio; and a logical decision circuit which has a first AND gate that receives said signal of first condition and that is opened when said signal of third condition is not supplied, an OR gate which performs logical OR operation with the output of said first AND gate and said signal of second condition, and a second AND gate which performs logical AND operation with the inverted logic of the output of said OR gate and said signal of fourth condition for producing a lock signal for disabling the function of said protective signal.

2. A protective relay according to claim 1, and further including a time delay circuit which is connected to said second AND gate in cascade, and which produces said lock signal when the output of said second AND gate is held active for more than a predetermined period of time.

3. A protective relay according to claim 1, wherein said signal of said fourth condition is further supplied as an inverted logic input to said first AND gate.

4. A protective relay which generates signals to protect an object in a power system that is to be protected in response to a differential signal and a suppress signal obtained from electric currents that are detected from two separate points of the object, said protective relay comprising:

a first filter circuit which extracts a fundamental wave component from said differential signal;

a second filter circuit which extracts a second harmonic component from said differential signal;

a detector which produces a signal of first condition when said fundamental wave component extracted by said first filter circuit is greater than said suppress signal by more than a predetermined ratio;

a comparator which produces a signal of second condition when the ratio of the sum of said second harmonic component extracted by said second filter circuit and a predetermined bias value with respect to the fundamental wave component extracted by said first filter circuit is greater than a predetermined ratio; and an AND gate which performs logical AND operation with said signal of first condition and the inverted logic signal of said signal of second condition, and which generates said protection signal.

* * * * *